United States Patent [19]
Barbee et al.

[11] Patent Number: 6,034,163
[45] Date of Patent: Mar. 7, 2000

[54] POLYESTER NANOCOMPOSITES FOR HIGH BARRIER APPLICATIONS

[75] Inventors: Robert Boyd Barbee; James Christopher Matayabas, Jr.; Jack Wesley Trexler, Jr.; Rodney Layne Piner, all of Kingsport, Tenn.

[73] Assignee: Eastman Chemical Company, Kingsport, Tenn.

[21] Appl. No.: 08/995,178

[22] Filed: Dec. 22, 1997

[51] Int. Cl.[7] ................................ C08J 5/10; C08K 3/34; C08L 31/00
[52] U.S. Cl. ...................... 524/445; 252/315.2; 524/447; 524/448
[58] Field of Search ...................... 523/200, 216; 524/445, 447, 448, 450, 451, 789, 791, 714, 718, 736, 739, 879; 423/700, 712; 252/315.2

[56] References Cited

U.S. PATENT DOCUMENTS

| | | |
|---|---|---|
| 2,531,427 | 11/1950 | Hauser . |
| 2,966,506 | 12/1960 | Jordan . |
| 4,081,496 | 3/1978 | Finlayson . |
| 4,105,578 | 8/1978 | Finlayson . |
| 4,116,866 | 9/1978 | Finlayson . |
| 4,208,218 | 6/1980 | Finlayson . |
| 4,391,637 | 7/1983 | Mardis et al. . |
| 4,410,364 | 10/1983 | Finlayson et al. . |
| 4,412,018 | 10/1983 | Finlayson et al. . |
| 4,434,075 | 2/1984 | Mardis et al. . |
| 4,434,076 | 2/1984 | Mardis et al. . |
| 4,450,095 | 5/1984 | Finlayson . |
| 4,517,112 | 5/1985 | Mardis et al. . |
| 4,677,158 | 6/1987 | Tso et al. . |
| 4,739,007 | 4/1988 | Okada et al. . |
| 4,769,078 | 9/1988 | Tso . |
| 4,810,734 | 3/1989 | Kawasumi et al. ............ 523/216 |
| 5,110,501 | 5/1992 | Kaudson et al. . |
| 5,164,460 | 11/1992 | Yano et al. . |
| 5,334,241 | 8/1994 | Jordan . |
| 5,336,647 | 8/1994 | Naé et al. . |
| 5,429,999 | 7/1995 | Naé et al. . |
| 5,747,560 | 5/1998 | Christiani et al. ............ 523/209 |

FOREIGN PATENT DOCUMENTS

| | | |
|---|---|---|
| 0 459 472 | 12/1991 | European Pat. Off. . |
| WO 93/04118 | 3/1993 | WIPO . |
| WO 97/30950 | 10/1997 | WIPO . |

OTHER PUBLICATIONS

A. Usuki, M. Kato, A. Okada, T. Kurauchi, J. Appl. Polym Sci. 63, 137 (1997).

Y. Kurokawa, H. Yasuda, A. Oya, J. Mater. Sci. Letters, 15, 1481 (1996).

T. J. Pinnavaia and Tie Lan, Chem. Mater. 6, 2216 (1994).

M. Kawasumi, N. Hasegawa, M. Kato, A. Usuki, and A. Okada, Macromolecules, 30, 6333 (1997).

*Primary Examiner*—James J. Seidleck
*Assistant Examiner*—U. K Rajguru
*Attorney, Agent, or Firm*—Karen A. Harding; Harry J. Gwinnell

[57] ABSTRACT

The present invention relates to a composition comprising a polymer having dispersed therein at least one layered clay material which has been cation exchanged with an organic cation salts represented by Formula I:

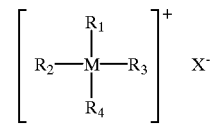

wherein M represents either nitrogen or phosphorous; $X^-$ represents an anion selected from the group consisting of halogen, hydroxide, or acetate anions, preferably chloride and bromide; $R_1$ is selected from the group consisting of straight and branched alkyl groups having at least 8 carbon atoms; $R_2$, $R_3$, and $R_4$ are independently selected from straight or branched alkyl groups having 1 to four carbon atoms; and at least one expanding agent which is compatible with said polymer. Preferred polymers include polyesters. The compositions of the present invention show vastly improved platelet separation as evidenced by higher than previously reported basal spacing.

22 Claims, No Drawings

POLYESTER NANOCOMPOSITES FOR HIGH BARRIER APPLICATIONS

BACKGROUND OF THE INVENTION

Polyesters such as poly(ethylene terephthalate) (PET) are widely used in bottles and containers which are used for carbonated beverages, fruit juices, and certain foods. Because of the limited barrier properties with regard to oxygen, carbon dioxide and the like, PET containers are not generally used for products requiring long shelf life. It would therefore be desirable to provide improved barrier properties.

This invention relates to polyester composite materials having improved barrier. The polyester composite materials of this invention are useful for forming packages that have improved gas barrier properties. Containers made from these polyester composite materials are ideally suited for protecting consumable products, such as foodstuffs, soft drinks, and medicines.

PRIOR ART

A. Usuki, M. Kato, A. Okada, T. Kurauchi, J. Appl. Polym. Sci. 63 137(1997) describes a polypropylene composite that is made by melt mixing polypropylene with an organoclay that has been expanded with a polyolefin oligomer.

Y. Kurokawa, H. Yasuda, A. Oya, J. Mater. Sci. Letters. 15, 1481 (1996) describes a polypropylene composite that is made by copolymerizing diacetone acrylamide and maleic acid modified-polypropylene in the presence of an organoclay and melt mixing with polypropylene.

T. J. Pinnavaia and Tie Lan, Chem. Mater. 6, 2216 (1994) describes organoclays that have been expanded with epoxy resin monomers.

M. Kawasumi, N. Hasegawa, M. Kato, A Usuki, and A. Okada, Macromolecules, 30, 6333 (1997) describes a polypropylene composite that its made by simple melt-mixing of polypropylene, maleic anhydride modified polypropylene oligomers, and clays intercalated with stearylammonium ion.

U.S. Pat. No. 4,739,007 discloses polyamide composite materials containing layered clay mineral intercalated with organic onium salts.

U.S. Pat. No. 5,164,460 discloses polyimide composite materials containing layered clay mineral intercalated with organic onium salts.

WO 93/04118 relates to a process for forming polymeric composites which are comprised of platelet particles containing organic onium salts and dispersed in a polymeric matrix.

U.S. Pat. Nos. 5,336,647 and 5,429,999 describe the preparation of layered clays containing polyalkoxylated ammonium salts. Use of these clays in polyesters was not recognized.

Among the numerous patents that describe the preparation of layered clays containing ammonium salts are U.S. Pat. Nos. 2,531,427; 2,966,506; 4,081,496; 4,105,578; 4,116,866; 4,208,218; 4,391,637; 4,410,364; 4,412,018; 4,434,075; 4,434,076; 4,450,095; 4,517,112; 4,677,158; 4,769,078; 5,110,501; and 5,334,241.

DESCRIPTION OF THE INVENTION

This invention relates to polyester composite materials which are comprised of a polyester polymer and a pre-swelled layered organoclay material.

Specifically, the present invention relates to a composition comprising a polymer having dispersed therein at least one pre-swelled organoclay material comprising.

A layered clay material which has been cation exchanged with an organic cation salts represented by Formula I:

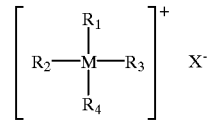

wherein M represents either nitrogen or phosphorous; X⁻represents an anion selected from the group consisting of halogen, hydroxide, or acetate anions, preferably chloride and bromide; $R_1$ is selected from the group consisting of straight and branched alkyl groups having at least 8 carbon atoms; $R_2$, $R_3$, and $R_4$ are independently selected from straight or branched alkyl groups having 1 to four carbon atoms; and at least one expanding agent which is compatible with said polymer.

Another embodiment of the present invention is a polyester composite comprising at least one polyester having dispersed therein up to about 30 weight percent of an expanded organoclay comprising (a) 20 to 80 weight percent of a swellable layered silicate clay such as montmorillonite that has been ion exchanged with an onium salt having one substituent selected from the group consisting of straight and branched alkyl groups having at least 8 carbon atoms and (b) 80 to 20 weight percent of at least one expanding agent.

Although some enhancement of barrier of a polyester occurs by incorporation of an organoclay itself, it was found unexpectedly that a greater improvement in barrier occurred when the organoclay was pre-swelled with an expanding agent.

Without being bound by any particular theory, it is believed that the interlayer spacing of the clay increases due to the expanding agent, and as a result, the interaction of the platelet particle layers are weakened to provide improved dispersion in the polyester.

An organoclay is defined here as a swellable layered clay material that has been ion exchanged with an onium ion. An expanding agent is defined here as any material that will increase the basal spacing of an organoclay when introduced into the galleries. An expanded organoclay is defined here as an organoclay that has been pre-swelled with an expanding agent.

These novel polyester composites containing the expanded organoclay exhibit lower oxygen permeability than the polyester or the polyester organoclay blend alone. The improvement in oxygen permeability is clearly apparent in the comparison of film prepared from (1) unmodified poly(ethylene terephthalate) and (2)poly(ethylene terephthalate)-platelet particle composites containing 2 wt % of bis(2-hydroxyethyl) methyl tallow ammonium montmorillonite and (3) poly(ethylene terephthalate)-platelet particle composite containing 2 wt % of bis(2-hydroxyethyl) methyl tallow ammonium montmorillonite and pre-swelled with the expanding agent poly(ethylene oxide) with molecular weight of 3350. The oxygen permeabilities of (1), (2), and (3) are 12, 11, and 6 cc-mil/100 in²–24 hours-atm, respectively. These examples and other examples demonstrating this invention are shown in Table 1

Organoclay materials

The compositions of the present invention comprise between about 0.01 and about 25 wt %, preferably between 0.5 and 25 wt %, more preferably between 0.5 and 15 wt % and most preferably between 0.5 and 10 wt % of at least one certain expanded organoclay which is derived from organic and inorganic clay materials. The amount of expanded organoclays is determined by measuring the amount of ash of the polyester-platelet compositions when treated in accordance with ASTM D5630-94, which is incorporated herein by reference.

The platelet particles of the present invention have a thickness of less than about 2 nm and a diameter in the range of about 10 to about 1000 nm. For the purposes of this invention measurements refer only to the platelet particle and not any dispersing aids or pretreatment compounds which might be used. Suitable platelet particles are derived from clay materials which are free flowing powders having a cation exchange capacity between about 0.3 and about 3 meq/g and preferably between about 0.8 and about 1.5 meq/g. Examples of suitable clay materials include mica-type layered phyllosilicates, including clays, smectite clays, sodium montmorillonite, sodium hectorite, bentonites, nontronite, beidellite, volkonskoite, saponite, sauconite, magadiite, vermiculite, mica, kenyaite, synthetic sodium hecotorites, and the like. Clays of this nature are available from various companies including Southern Clay Products and Nanocor, Inc. Generally the clay materials are a dense agglomeration of platelet particles which are closely stacked together like cards.

Preferred swellable layered clay materials are phyllosilicates of the 2:1 type having a cation exchange capacity of 50 to 200 milliequivalents per 100 grams of mineral. The most preferred swellable layered clay materials are smectite clay minerals, specifically montmorillonite.

Other non-clay materials having the above described ion exchange capacity and size, such as chalcogens may also be used as the source of platelet particles under the present invention. These materials are known in the art and need not be described in detail here.

Dispersions of platelet particles having large basal spacing (greater than about 3 nm) have not been previously disclosed. Previous patents and applications have claimed to produce polyesters containing intercalated or exfoliated platelet particles, as indicated by large basal spacings or the lack of a detectable basal spacing by X-ray, however, the results could not be reproduced, particularly in polyesters.

Cation Exchange Materials

Useful organic cation salts for the process of this invention can be represented by Formula I:

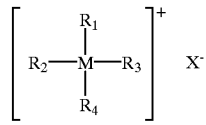

Wherein M represents nitrogen; or phosphorus $X^-$ represents an anion selected from the group consisting of halogen, hydroxide, or acetate anions, preferably chloride and bromide; $R_1$ is selected from the group consisting of straight and branched alkyl groups having at least 8 carbon atoms; $R_2$, $R_3$, and $R_4$ are independently selected from organic and oligomeric ligands or may be hydrogen. Examples of useful organic ligands include, but are not limited to, linear or branched alkyl groups having 1 to 22 carbon atoms, aralkyl groups which are benzyl and substituted benzyl moieties including fused ring moieties having linear chains or branches of 1 to 22 carbon atoms in the alkyl portion of the structure, aryl groups such as phenyl and substituted phenyl including fused ring aromatic substituents, beta, gamma unsaturated groups having six or less carbon atoms, and alkyleneoxide groups having 2 to 6 carbon atoms. Examples of useful oligomeric ligands include, but are not limited to, poly(alkylene oxide), polystyrene, polyacrylate, polycaprolactone, and the like.

Preferably $R_2$, $R_3$, and $R_4$ are independently selected from straight or branched alkyl groups having I to four carbon atoms. More preferably at least one of $R_2$, $R_3$, and $R_4$ is methyl and preferably all of $R_2$, $R_3$, and $R_4$ are methyl.

Examples of useful onium ions includes alkyl ammonium ions, such as dodecylammonium, octadecyl ammonium, and bis(2-hydroxyethyl)octadecyl methyl ammonium, and the like, and alkyl phosphonium ions, such as octadecyltriphenyl phosphonium.

According to the process of the present invention, the selected cation exchanged clay material is treated with at least one expanding agent to separate the agglomerates of platelet particles to individual platelet particles and small tactoids prior to introducing the platelet particles to the polyester. Separating the platelet particles also improves the polyester/platelet interface. Any treatment that achieves the above goals may be used. Examples of useful treatments include intercalation with water soluble or water insoluble polymers, organic reagents or monomers, silane compounds, metals or organometallics, organic cations to effect cation exchange, and their combinations.

The process for manufacturing the polyester composite material of this invention comprises (1) preparing the organoclay material (2) pre-swelling the organoclay material with an expanding agent and (3) incorporating the expanded organoclay in a polyester.

The first step of this invention is the preparation of the organoclay material by the reaction of a swellable layered clay with an onium ion. The organoclay materials of this invention may be prepared by dispersing the clay in hot water, most preferably from 50 to 80° C., adding the onium ion with agitation, then blending for a period of time sufficient for the onium compound to exchange most of the cations, usually sodium ions, associated with the layers of the clay. It is desirable to use a sufficient amount of the onium ions to exchange most of the cations present in the galleries. The organoclay material is isolated by methods known in the art, such as filtration or centrifugation.

The second step of this invention is to pre-swell the organoclay with an expanding agent. Although several methods are available to incorporate the expanding agent within the organoclay, such as melt mixing of the expanding agent and organoclay, spray drying of a mixture of the expanding agent and organoclay, or preparation of the organoclay in the presence of the expanding agent, the most expedient method for this invention was to dissolve or suspend both the expanding agent and organoclay in a solvent, such as methylene chloride, then evaporate off the solvent to provide the expanded organoclay.

The expanding agents that are useful for this invention encompass a wide range of polymer compositions from oligomers with low molecular weight to high molecular weight polymers Preferred polymers are compatible or miscible with the polyester to ensure clarity of the final product.

Suitable expanding agents are poly(ethylene oxide), poly (caprolactone), and polyesters comprising residues from at least one dibasic acid and one glycol. In some cases it may be necessary to use more than one glycol to improve miscibility of the expanding agent in organic solvents. The primary dibasic acids are terephthalic, isophthalic, naphthalenedicarboxylic, 1,4cyclohexanedicarboxylic acid, sodiosulfoisophthalic acid and the like. Typical glycols used in the polyester include those containing two to about ten carbon atoms. Preferred glycols include ethylene glycol, diethylene glycol, 1,4butanediol, 1,3-propanedimethanol, and 1,4-cyclohexanedimethanol. Molecular weights of these polymers can range from 250 to 25,000.

The third step of this invention is to incorporate the expanded organoclay material into a melt-processible polyester. This process is directed toward preparation of polyester composites wherein the dispersed phase is preferably comprised of individual layers of the layered clay material or tactoids of less than about ten layers having a basal spacing greater than about 30 angstroms. The intercalated clay mineral component of the compound of this invention is present in amounts up to 30 weight percent, more preferable up to about 15 weight percent. The polyester component of the compound of the present invention is present in amounts of at least about 70 weight percent, more preferably at least 85 weight percent.

One method of incorporation of the expanded organoclay into a polyester is the polycondensation of monomers to the polyester in the presence of the expanded organoclay material. The polyester in the present invention may be produced using well known polycondensation procedures. The polyester composite prepared in this manner may also be treated with solid state polymerization to attain sufficient inherent viscosity to permit melt processing.

Another method of incorporation is by the melt extrusion of a blend of the expanded organoclay and a melt-processible polyester. Conventional polymer and additive blending techniques are used in which the polymer is heated to a temperature sufficient to form a polymer melt and the desired amount of the expanded organoclay is added in a suitable mixer, for example an extruder, a Banbury Mixer, and the like. The process should subject the mixture with sufficient shear to delaminate at least 90% by weight of the intercalated material into individual layers. The polyester composite prepared in this manner may also be treated with solid state polymerization to attain sufficient inherent viscosity to permit melt processing.

In the expansion of organoclays from a solvent, it is preferred that the expanding agent be present in an amount sufficient to provide a fully expanded organoclay. FIG. 1 shows X-ray diffraction patterns of the organoclay, tallow methyl dihydroxyethylammonium montmorillonite, that has been expanded in methylene chloride with PETG 6763, commercially available from Eastman Chemical Company, as expanding agent to provide expanded organoclays containing 40 and 60 weight percent of clay. Two X-ray reflections are evident, one at about 3.2 nm corresponding to the fully expanded organoclay, and another at about 2.2 nm, corresponding to the partially expanded organoclay. These examples show that the expanded organoclay must contain less than about 40 weight percent of clay in order to provide a predominately fully expanded organoclay. Examples of expanded organoclays from the solvent methylene chloride are shown in Table 1.

In the expansion of organoclays in water a fully expanded organoclay is obtained when the clay content is more than 20% but less than 60% by weight of clay (see FIG. 2). Examples of expanded organoclays from water are shown in Table 2.

The expanding agents that are useful for this invention encompass a wide range of polymer compositions from oligomers with low molecular weight to high molecular weight polymers. In method 2 described above, preferred polymers are those that are soluble or will suspend readily in organic solvents, such as methylene chloride or toluene. Preferred organoclays are those that can be swelled by these solvents, thus allowing easy access of the expanding agent to the interlayer spacing of the organoclay. Preferred polymers used as expanding agents should be compatible or miscible with the polyester used to form the final article if clarity is needed in the product.

Suitable expanding agents are poly(caprolactone), poly(dimethylsiloxane), polyepoxides, polystyrene, polyacrylates, polycarbonates, polyurethanes, polysulfones, polyethers, polyketones, polyamides, and polyesters comprising residues from at least one dibasic acid and one glycol. In some cases in the preparation of polyesters it may be necessary to use more than one glycol to improve miscibility of the expanding agent in organic solvents. The primary dibasic acids are terephthalic, isophthalic, octadecyloxyisophthalic acid, naphthalenedicarboxylic, 1,4-cyclohexanedicarboxylic acid, sodiosulfoisophthalic acid and the like. Typical glycols used in the polyester include those containing two to about ten carbon atoms. Preferred glycols include ethylene glycol, diethylene glycol, 1,4-butanediol, 1,3-propanedimethanol, and 1,4-cyclohexanedimethanol. Molecular weights of these polymers can range from 250 to 25,000. Monomeric species may also act as expanding agents. Among these are Zonyl A and vitamin E.

For convenience in this work, the expanded organoclay was coated on the surface of the polyester pellets prior to extrusion. This was accomplished by blending polyester pellets with the expanded organoclay in methylene chloride followed by evaporation of the methylene chloride.

Polymers

The treated organoclay of the present invention may be combined with a wide variety of polymers including thermoplastic polymers and mixtures thereof and vulcanized and thermoplastic resins. Thermoplastic resins include polylactones, polyurethanes, linear long chain diols, polyether diols, polysulfones, polyether ether ketones, polyamides, polyesters, polyesteramides, poly(arylene) oxides, polyarylene sulfides, polyetherimides, vinyl polymers and their copolymers, ethylene acrylic acid copolymers, ethylene vinyl alcohol copolymers, acrylonitrile copolymers, methacrylate-styrene copolymers, ethylene-ethyl acrylate copolymers, methacryalted butadiene-styrene compolymers, polyolefins, cellulose ester plastics and the like. Many suitable polymers are disclosed in WO 93/04118, the disclosure of which is incorporated herein by reference. Particularly suitable are polyesters for incorporation of the expanded organoclays which include at least one dibasic acid and at least one glycol. The primary dibasic acids are terephthalic, isophthalic, naphthalenedicarboxylic, 1,4-cyclohexanedicarboxylic acid and the like. The various isomers of naphthalenedicarboxylic acid or mixtures of isomers may be used, but the 1,4-, 1,5-, 2,6-, and 2,7-isomers are preferred. The 1,4-cyclohexanedicarboxylic acid may be in the form of cis, trans, or cis/trans mixtures. In addition to the acid forms, the lower alkyl esters or acid chlorides may be also be used.

The dicarboxylic acid component of the polyester may optionally be modified with up to about 50 mole percent of one or more different dicarboxylic acids. Such additional dicarboxylic acids include dicarboxylic acids having from 6 to about 40 carbon atoms, and more preferably dicarboxylic acids selected from aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of suitable dicarboxylic acids include terephthalic acid, phthalic acid, isophthalic acid, naphthalene-2,6-dicarboxylic acid, cyclohexanedicarboxylic acid, cyclohexanediacetic acid, diphenyl4,4'-dicarboxylic acid, succinic acid, glutaric acid, adipic acid, azelaic acid, sebacic acid, diglycolic acid, 1,3-phenylenedioxy diacetic acid and the like. Polyesters may be prepared from two or more of the above dicarboxylic acids.

The polymer may also contain small amounts of trifunctional or tetrafunctional comonomers to provide controlled branching in the polymers. Such comonomers include trimellitic anhydride, trimethylolpropane, pyromellitic dianhydride, pentaerythritol, trimellitic acid, pyromellitic acid and other polyester forming polyacids or polyols generally known in the art.

Typical glycols used in the polyester include aliphatic glycols containing from two to about ten carbon atoms, aromatic glycols containing from about 6 to about 15 carbon atoms and cycloaliphatic glycols containing from about 7 to about 14 carbon atoms. Preferred glycols include ethylene glycol, 1,4-butanediol, 1,6-hexanediol, 1,4-cyclohexanedimethanol, diethylene glycol and the like. Resorcinol and hydroquinone are preferred aromatic glycols. The glycol component may optionally be modified with up to about 50 mole percent of one or more additional diols. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(2-hydroxyethoxy)-benzene, 1,3-di-(2-hydroxyethoxy)benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and the like. 1,4-Cyclohexanedimethanol may be used as the cis, trans or cis/trans mixtures. Polyesters may be prepared from one or more of the above diols.

Bifunctional compounds such as hydroxybenzoic acid may also be included.

The amount of expanded organoclay incorporated into the polyester may vary widely depending on the intended use of the composite. The amount of material employed, based on the clay content, is preferably from about 2 to 20% by weight of the mixture.

The polyester containing the homogeneously distributed layered clay can be formed into film by suitable film-forming methods, such as extrusion or pressing, or when the appropriate polyester is used, may be blown into bottles.

EXAMPLE 1

This example illustrates the method for preparing the organoclay materials used in this invention. Sodium montmorillonite (10 grams, 9.5 milliequivalents, clay supplied by Southern Clay Products and reported to have a cation exchange capacity of 95 milliequivalents/100 grams) was mixed with 490 ml of water at 60° C. in a Vitamix blender to form a 2% by weight slurry of clay in water. Bis(2-hydroxyethyl) methyl tallow ammonium chloride (4.0 grams, 9.5 milliequivalents) commercially available as a 74% solution as Ethoquad T/12 was added to the Vitamix blender and the mixture blended at high speed for one minute. The solids formed were removed by filtration on a Buchner funnel. The product was reslurried in 250 ml of water in a Vitamix blender, filtered again, and dried in a circulating air oven at 60° C. for 16 hours. The product exhibited a basal spacing by X-ray diffraction of 2.0 nanometers.

EXAMPLE 2

This example illustrates the method used for preparing the expanded organoclay materials used in this invention from an organic solvent. The expanding agent polydimethylsiloxane, carbinol terminated (Petrach Systems, Inc.) (2.26 grams), was dissolved in 60 ml of methylene chloride. The organoclay bis(2-hydroxyethyl) methyl tallow ammonium montmorillonite (2.73 grams) was then added and the mixture blended at high speed in a Vitamix blender. The solvent was then allowed to evaporate to provide a solid material having a basal spacing by X-ray diffraction of 4.5 nanometers.

EXAMPLES 3–16

The compositions are prepared according to the procedure set forth in Example 2 and are listed in Table 1. The organoclay used is bis(2-hydroxyethyl) methyl tallow ammonium montmorillonite and the weight percent of clay used in each example based on total weight of expanded organoclay is 40 weight percent. Ethoquad 18–25 is commercially available from AKZO Chemical Company. PD7610 is commercially available from Anderson Chemical Company. AQ55 and PETG6763 are commercial available polyesters made by Eastman Chemical Company. Epon 828 is available from Shell Chemical Company. SCX800 is made by S. C. Johnson Wax, Co.

TABLE 1

| Example | Expanding Agent | X-Ray Basal, nm |
| --- | --- | --- |
| Comparative Example 1 | None | 2.0 |
| 3 | Polyethylene glycol distearate | 4.2 |
| 4 | Zonyl A | 3.8 |
| 5 | Polysar 101 polystyrene | 3.7 |
| 6 | Vitamin E | 3.6 |
| 7 | Ethoquad 18-25 | 3.5 |
| 8 | Polyglycidylacrylate PD7610 | 3.4 |
| 9 | AQ55 | 3.2 |
| 10 | PETG 6763 | 3.1 |
| 11 | Epon 828 | 3.1 |
| 12 | Polycaprolactone | 3.0 |
| 13 | Polymethacrylate SCX800B | 3.0 |
| 14 | Poly(vinyl pyrrolidone) | 2.9 |
| 15 | Makrolon 2608 Polycarbonate | 2.9 |
| 16 | Poly(ethylene oxide) mw 3350 | 2.4 |

EXAMPLE 17

This example illustrates the method used for preparing the expanded organoclay materials from an aqueous medium. The water soluble polyester AQ 55 (5.0 grams) was dissolved in 250 ml of hot water in a Vitamix blender. Sodium montmorillonite (5.0 grams, 4.75 milliequivalents, clay supplied by Southern Clay Products and reported to have a cation exchange capacity of 95 milliequivalents/100 grams) was added to the blender and blended for one minute. Octadecyl bis(polyoxyethylene[5]amine (2.32 grams, 4.75 meq), commercially available as Ethomeen 18/15 from AKZO Chemical Company, was suspended in 25 ml of water and 4.88 g of 0.973 N HCl was added to form the ammonium salt which immediately dissolved. This ammonium salt solution was then added to the Vitamix blender containing the AQ 55 and clay and the mixture was blended at high speed for one minute. The solids formed were removed by filtration on a Buchner funnel. The product was reslurried in 250 ml of water in a Vitamix blender, filtered again, and dried in an air circulating oven at 60° C. for 16 hours. The product exhibited a basal spacing by X-ray diffraction of 4.1 nanometers.

EXAMPLES 18–25

The compositions are prepared according to the procedure set forth in Example 17 and are listed in Table 2. The expanding agent in each case is AQ 55 and the weight percent of clay used in each example based on total weight of expanded organoclay is 40 weight percent.

TABLE 2

| Examples | Onium ion used with sodium montmorillonite | X-Ray Basal, nm Organo-clay | X-Ray Basal, nm Expanded Organo-clay |
|---|---|---|---|
| 18 | Octadecyltrimethyl ammonium | 2.0 | 3.9 |
| 19 | Octadecyl dihydroxyethyl ammonium | 1.7 | 3.8 |
| 20 | Octadecyl benzyldimethyl ammonium | 2.1 | 3.8 |
| 21 | Tallow methyl dihydroxyethyl ammonium | 1.9 | 3.6 |
| 22 | Dodecyltrimethyl ammonium | 1.6 | 3.2 |
| 23 | Hexadecyltributyl phosphonium | 2.2 | 3.1 |
| 24 | Octadecylammonium | 1.7 | 3.1 |
| 25 | Dodecylammonium | 1.4 | 3.0 |
| Comparative Example 2 | Tridodecylammonium | 2.5 | 2.7 |
| Comparative Example 3 | Tetramethyl | 1.4 | 1.4 |

COMPARATIVE EXAMPLE 1

The procedure of Example 2 was repeated except that no expanding agent was used. The basal spacing of the product was 2.0

COMPARATIVE EXAMPLE 2

The procedure of Example 17 was repeated except that tridodecylammonium chloride was used. The product had a basal spacing of 2.7 nanometers.

COMPARATIVE EXAMPLE 3

The procedure of Example 17 was repeated except that tetramethylammonium chloride was used. The product had a basal spacing of 1.4 nanometers.

We claim:
1. A composition comprising (i) a layered clay material which has been cation exchanged with an organic cation salt represented by formula I:

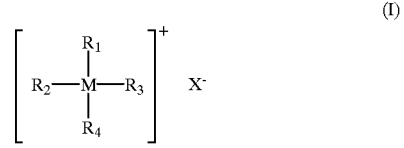

wherein M represents either nitrogen or phosphorus; $X^-$ represents an anion of halogen, hydroxide, or an acetate anion; $R_1$ is a straight or branched chain alkyl group having at least 8 carbon atoms; $R_2$, $R_3$, and $R_4$ are independently a straight or branched alkyl group having 1 to 4 carbon atoms; and (ii) at least one expanding agent, wherein the cation-exchanged clay material contains platelet particles, the expanding agent separates the platelet particles into individual platelet particles and small tactoids, and the expanding agent is a polymer, or vitamin E.

2. The composition of claim 1 wherein $R_1$ is selected from the group consisting of straight and branched alkyl groups having between 8 and 25 carbon atoms.

3. The composition of claim 1 wherein $R_1$ is selected from the group consisting of straight and branched alkyl groups having between 12 and 20 carbon atoms.

4. The composition of claim 1 wherein $R_2$, $R_3$, and $R_4$ are independently selected from straight or branched alkyl groups having 1 to four carbon atoms and at least one of $R_2$, $R_3$, and $R_4$ is methyl.

5. The composition of claim 1 wherein $R_2$, $R_3$, and $R_4$ are each methyl.

6. A composite composition comprising at least one polymer selected from the group consisting of thermoplastic polymers and mixtures thereof and vulcanized and thermoplastic resins having dispersed therein the composition of claim 1, 2, 3 or 4 wherein said expanding agent is compatible with said polymer.

7. The composition of claim 6 wherein said polymer is at least one thermoplastic resin selected from the group consisting of a polylactone, polyurethane, linear long chain diol, polyether diol, polysulfone, polyether ether ketone, polyamide, polyester, polyesteramide, poly(arylene)oxide, polyarylene sulfide, polyetherimide, vinyl polymer, vinyl copolymer, ethylene acrylic acid copolymer, ethylene vinyl alcohol copolymer, acrylonitrile copolymer, methacrylate-styrene copolymer, ethylene-ethyl acrylate copolymer methacrylated butadiene-styrene copolymer, polyolefin, and cellulose ester plastic.

8. The composition of claim 6 wherein said polymer is at least one polyester, and $R_2$, $R_3$ and $R_4$ may also independently be H.

9. The composition of claim 8 wherein said polyester is dervied from at least one dibasic acid and at least one glycol.

10. The composition of claim 8 wherein said dibasic acid comprises terephthalic, isophthalic, naphthalenedicarboxylic, 1,4-cyclohexanedicarboxylic acid and mixtures thereof.

11. The composition of claim 10 wherein said dibasic acid further comprises up to about 50 mole percent of one or more second dicarboxylic acids selected from the group consisting of an aromatic dicarboxylic acid having 8 to 14 carbon atoms, an aliphatic dicarboxylic acid having 4 to 12 carbon atoms, and a cycloaliphatic dicarboxylic acid having 8 to 12 carbon atoms.

12. The composition of claim 8 wherein the glycol is selected from the group consisting of an aliphatic glycol containing from 2 to about 10 carbon atoms, an aromatic glycol containing from about 6 to about 15 carbon atoms and a cycloaliphatic glycol containing from about 7 to 14 carbon atoms.

13. The composition of claim 12 wherein said glycol further comprises up to about 50 mole percent of one or more additional diols selected from the group consisting of a cycloaliphatic diol having 6 to 20 carbon atoms and an aliphatic diol having 3 to 20 carbon atoms.

14. The composition of claim 1 wherein said layered clay material is incorporated in an amount between about 2 to 20 % by weight of the mixture.

15. A composition comprising at least one polymer having dispersed therein at least one layered clay material which has been cation exchanged with an organic cation salt having one substituent $R_1$ selected from the group consisting of a straight and a branched alkyl group having at least 8 carbon atoms; and at least one expanding agent which is compatible with said polymer, wherein basal spacing between the layers of the layered clay material is greater than about 3.4, and wherein the cation exchanged clay material contains platelet particles, the expanding agent separates the platelet particles into individual platelet particles and small tactoids, and the expanding agent is a polymer, or vitamin E.

16. A composition comprising at least one polyester having dispersed therein at least one layered clay material which has been cation exchanged with an organic cation salt having one substituent $R_1$ selected from the group consisting of a straight and a branched alkyl group having at least 8 carbon atoms, and at least one expanding agent which is compatible with said polymer, wherein said basal spacing between the layers of the layered clay material is greater than about 3, and wherein the cation exchanged clay material contains platelet particles, the expanding agent separates the platelet particles into individual platelet particles and small tactoids, and the expanding agent is a polymer, or vitamin E.

17. The composition of claim 1, wherein X represents chloride or bromide.

18. The composition of claim 1, wherein the expanding agent is a low molecular weight oligomer.

19. The composition of claim 15, wherein the expanding agent is a low molecular weight oligomer.

20. The composition of claim 16, wherein the expanding agent is a low molecular weight oligomer.

21. A composition comprising
(i) a layered clay material that has been cation-exchanged with an organic cation salt represented by formula (I):

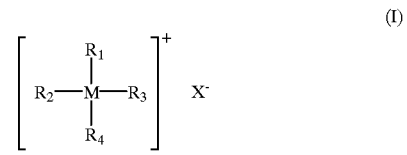

wherein M is nitrogen or phosphorous, $X^-$ is a halide, hydroxide, or acetate anion, $R_1$ is a straight or branched alkyl group having at least 8 carbon atoms, and $R_2$, $R_3$, and $R_4$ are independently hydrogen or a straight or branched alkyl group having 1 to 22 carbon atoms; and (ii) at least one expanding agent,
wherein the cation-exchanged clay material contains platelet particles, the expanding agent separates the platelet particles into individual platelet particles and small tactoids, and the expanding agent is a polymer, or vitamin E.

22. The composition of claim 21, wherein X is chloride or bromide.

* * * * *